United States Patent [19]
Dawson et al.

[11] 4,019,749
[45] Apr. 26, 1977

[54] SEALS

[75] Inventors: Peter Dawson, Bourne End; Charles Jack Barrett, Hillingdon, both of England

[73] Assignee: Taylor Woodrow Construction Limited, Southall, England

[22] Filed: Oct. 23, 1975

[21] Appl. No.: 625,153

[30] Foreign Application Priority Data

Oct. 24, 1974 United Kingdom ............ 46125/74

[52] U.S. Cl. .................................. 277/58; 277/141
[51] Int. Cl.² .................................. F16J 15/00
[58] Field of Search ............. 277/58, 9, 141, 143, 277/237 R

[56] References Cited

UNITED STATES PATENTS

| | | | |
|---|---|---|---|
| 2,170,443 | 8/1939 | Barbarou | 277/58 |
| 2,692,584 | 10/1954 | Armington et al. | 277/58 |
| 3,156,475 | 11/1964 | Gerard et al. | 277/58 |
| 3,179,423 | 4/1965 | McCloud | 277/58 |
| 3,429,555 | 2/1969 | Wrenshall | 277/58 |

*Primary Examiner*—Robert I. Smith

[57] ABSTRACT

A seal for maintaining closure between a hollow cylindrical member and an end member closing the cylindrical member, the seal accommodating radial movement of the cylindrical member and movement of the end member in the direction at right angles to such radial movement.

17 Claims, 16 Drawing Figures

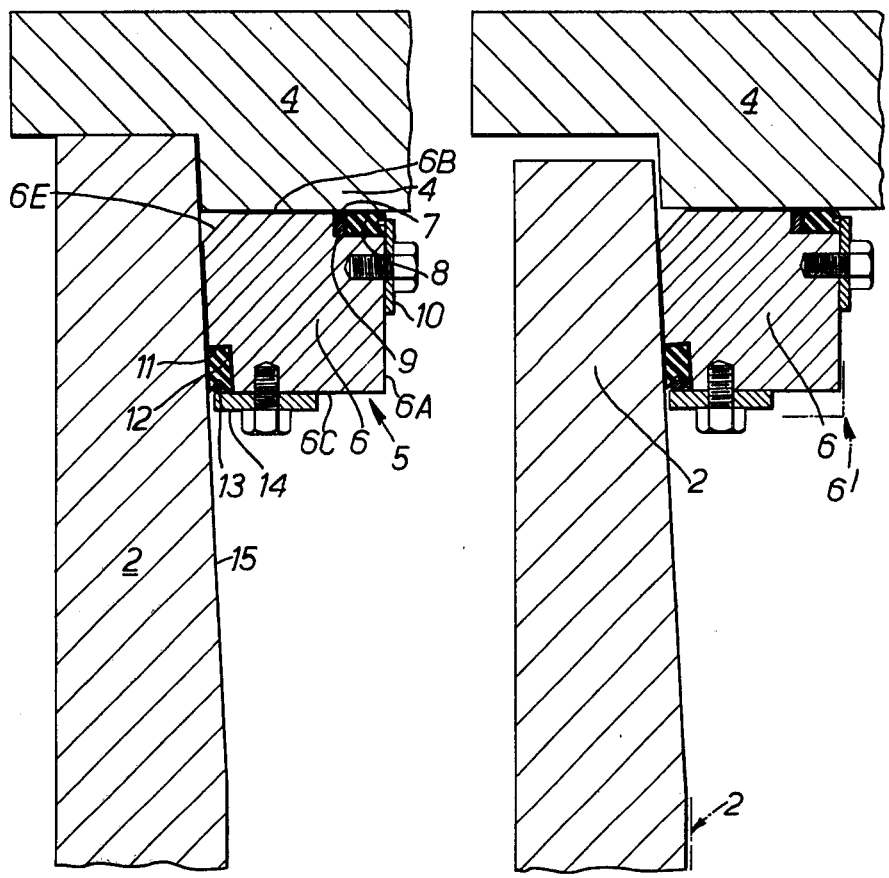
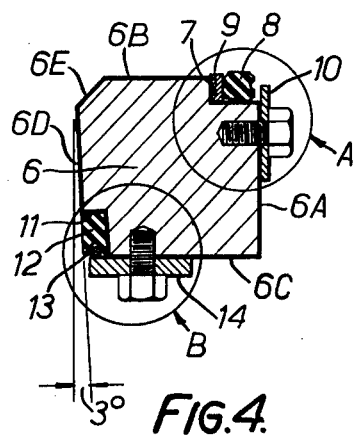

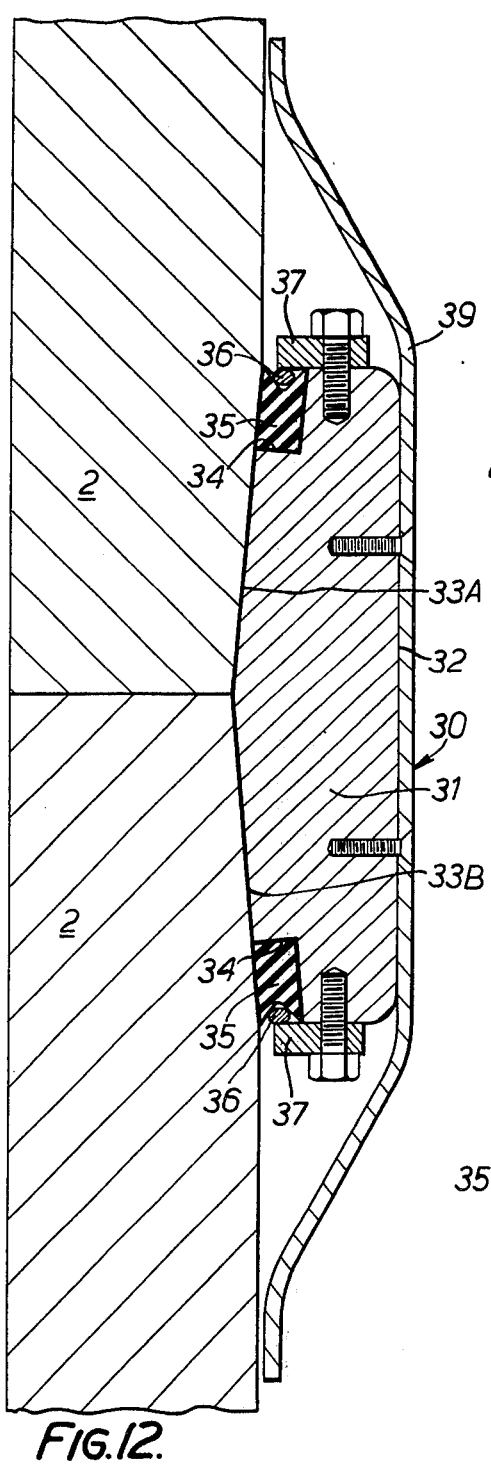
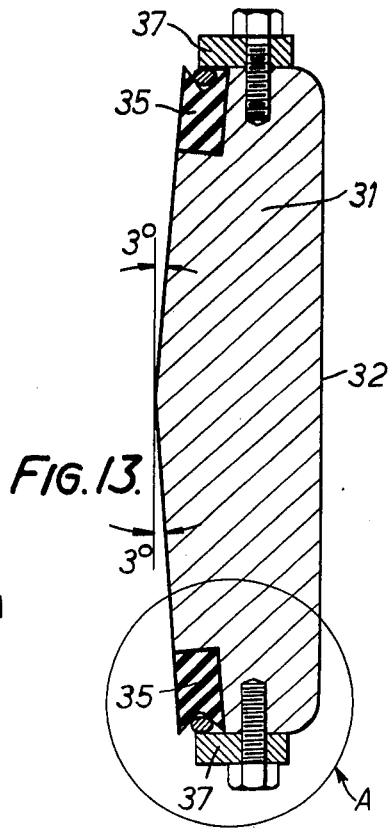
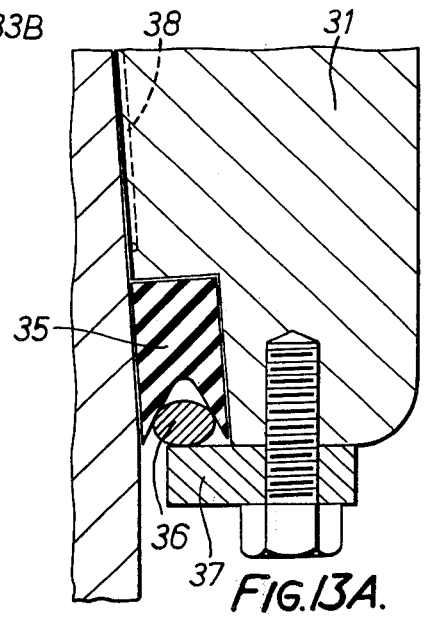
FIG.12.
FIG.13.
FIG.13A.

SEALS

This invention relates to seals, and is particularly concerned with seals for positioning at the ends of a pressure chamber to seal the main body of the chamber to opposite end plates of the chamber.

According to the present invention there is provided, for use with a hollow substantially cylindrical member and a member extending across the cylindrical member to close an end thereof, a seal for maintaining closure between these two members during radical movement of the cylindrical member, the seal comprising a carrier of ring configuration having a first surface for sliding contact with the inner surface of the cylindrical member and a second surface for sliding contact with a surface of the other member, the carrier carrying seal means disposed to be in contact with said surfaces of said members when said surfaces of said carrier and said members are in contact, and the carrier being able to expand or contract to permit said seal means to remain so in contact during said radial movement of the cylindrical member. Such a seal can not only accommodate radial movement of the cylindrical member, but can also accommodate movement of the other member in the direction at right angles to such radial movement, the carrier in this case moving in this direction to permit said seal means to remain in contact with the other member.

Figure 1:
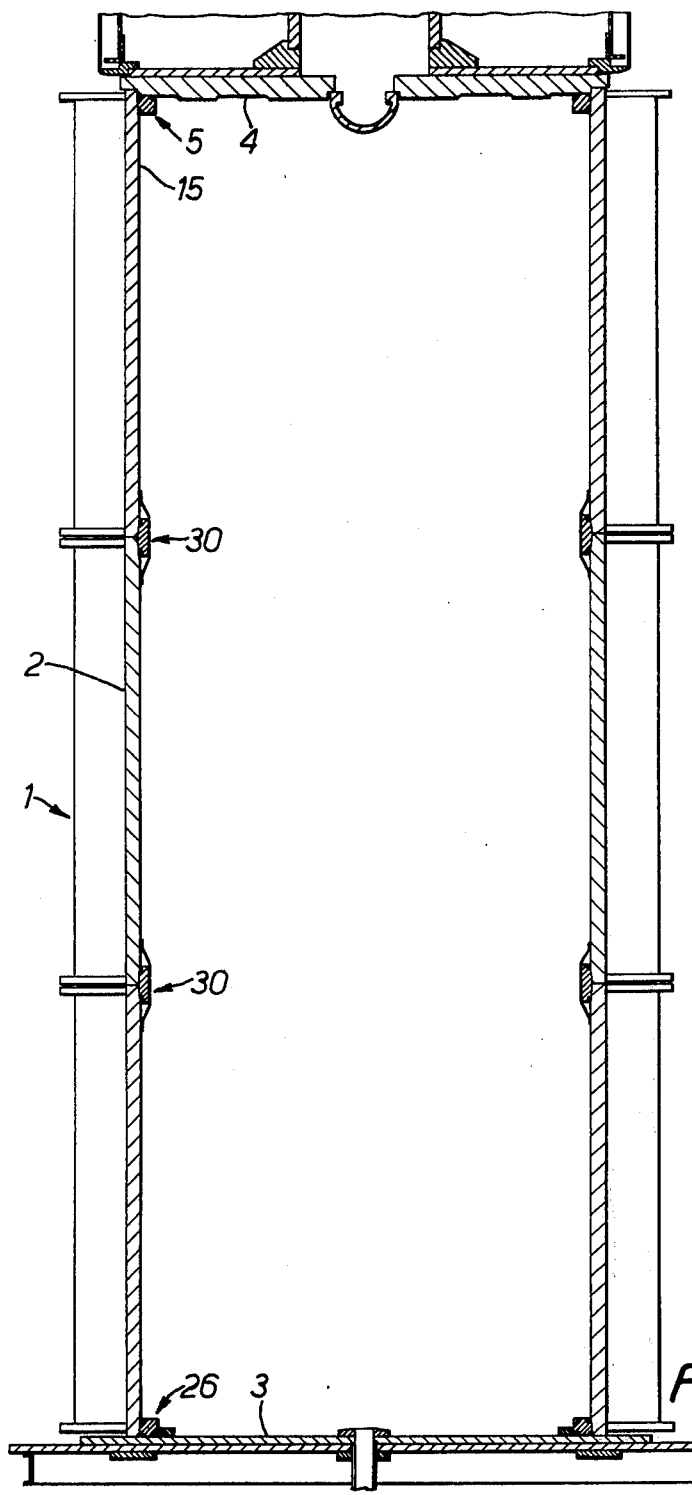
Figure 4A:
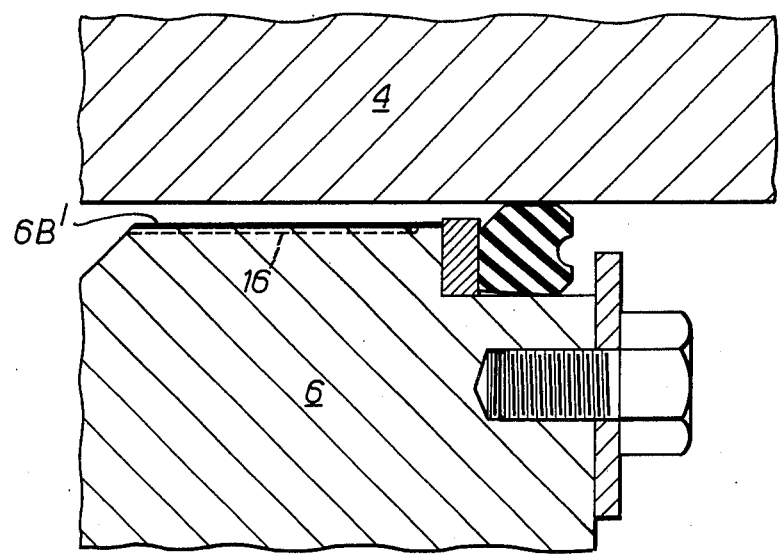
Figure 4B:
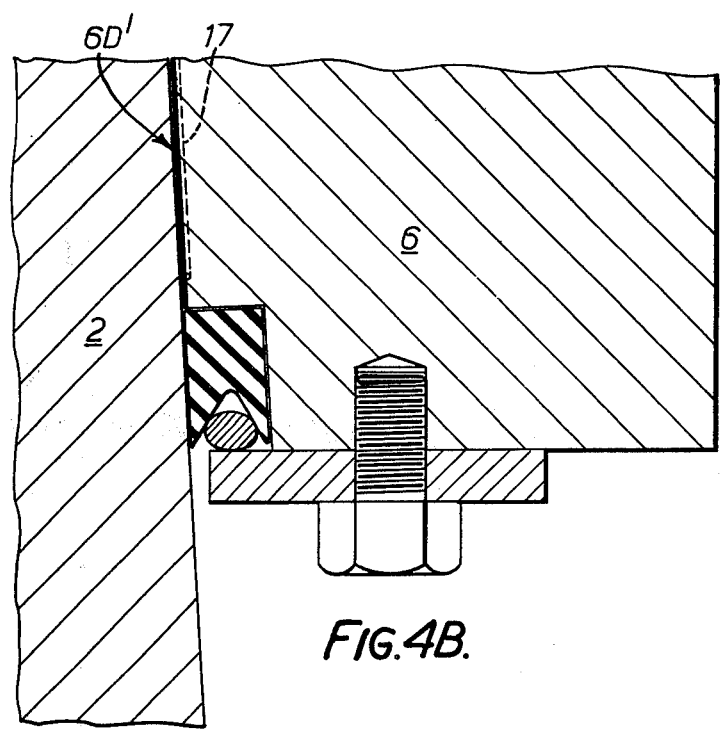
Figure 5:
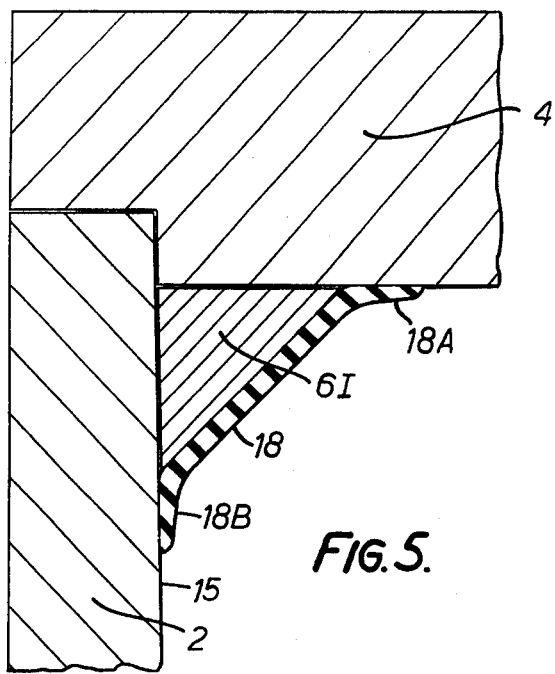
Figure 6:
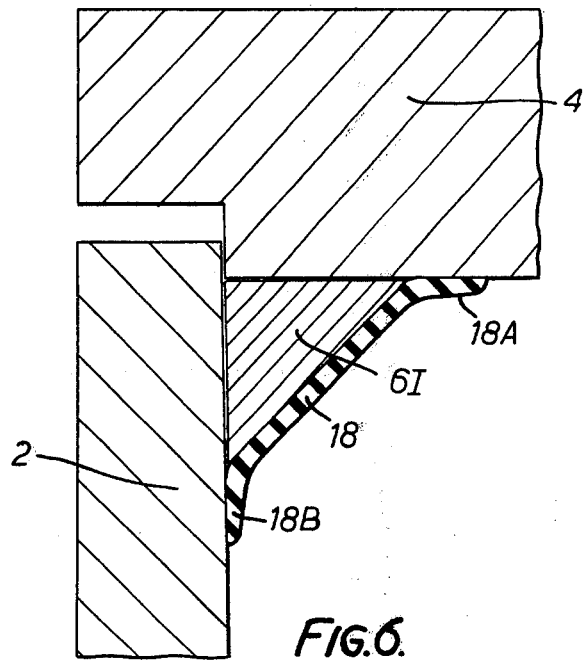
Figure 9:
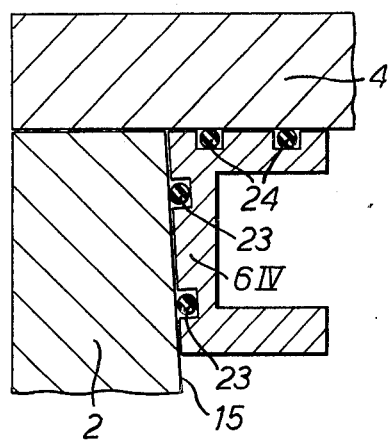
Figure 10:
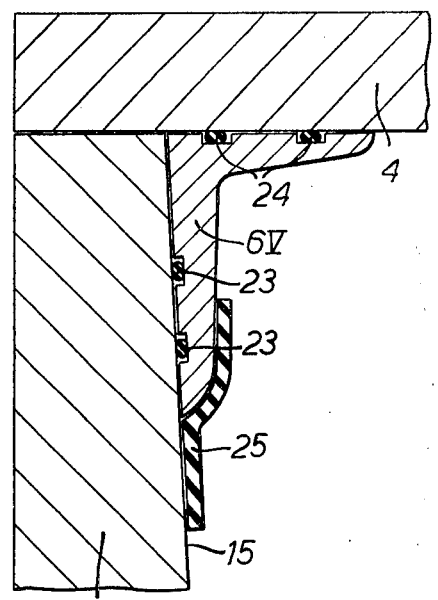
Figure 11:
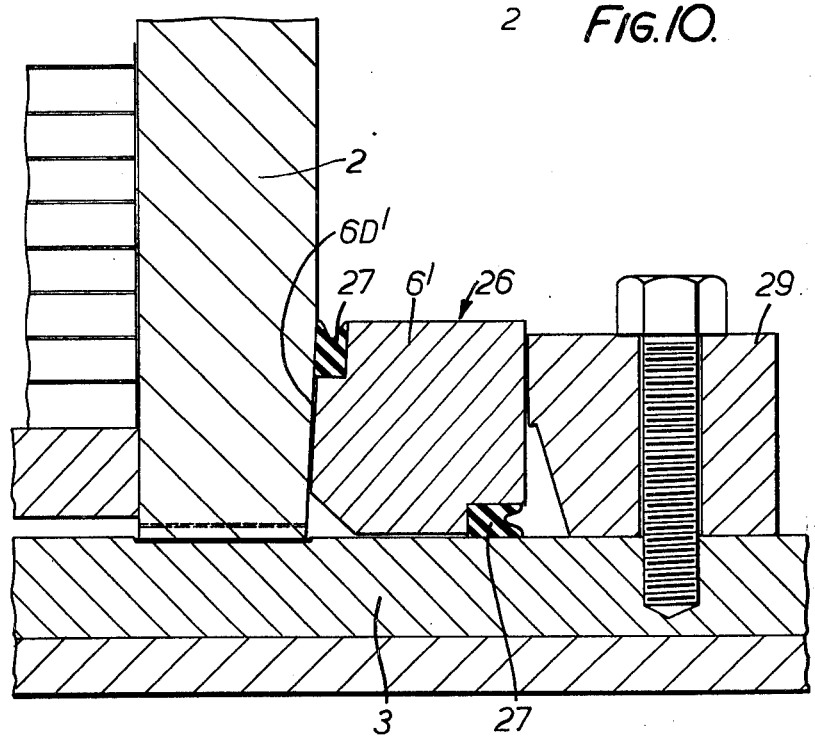

For a better understanding of the invention and to show how the same may be carried into effect, reference will now be made, by way of example, to the accompanying drawings, in which:

FIG. 1 is a sectional side view of a pressure chamber,

FIG. 2 is a sectional view of a detail of the chamber of FIG. 1, drawn to a larger scale and showing a first form of seal in accordance with the invention, provided at one end of the chamber, illustrated in a chamber unpressurized condition, FIG. 3 is a view similar to FIG. 2 but illustrating a chamber pressurized condition, FIG. 4 is a sectional view of the seal of FIGS. 2 and 3 shown out of the chamber, FIG. 4A is a detail, taken at A, of the seal as shown in FIG. 4, FIG. 4B is a detail, taken at B, of the seal as shown in FIG. 4, FIGS. 5 and 6 show diagrammatically, in chamber unpressurized and chamber pressurized conditions respectively, a second form of seal in accordance with the invention, FIGS. 7 to 10 show diagrammatically and in chamber pressurized condition in each case third, fourth, fifth, and sixth forms of seal in accordance with the invention, and FIG. 11 is a sectional view of a detail of the chamber of FIG. 1 showing a seal in accordance with the invention provided at the end of the chamber opposite the end of FIG. 2.

For completeness, FIGS. 12, 13 and 13A are included to show in greater detail a seal that is provided between adjoining sections of the chamber of FIG. 1, FIG. 12 showing the seal in position, FIG. 13 showing the seal alone, and FIG. 13A showing detail A of FIG. 13.

The pressure chamber 1 shown in FIG. 1 has a cylindrical main body 2 that is upright in use and that is closed at its base by a bottom end plate 3, and at its top by a top plate 4. The chamber is intended to be filled with water and pressurized so that items suspended from the top plate can be subjected to the water pressure within the chamber for test purposes. For example, the chamber can be constructed for pressurization to a value of the order of 86.25 N/mm$^2$ which will bring about a radial movement of the chamber body of the order of 3 mm and a vertical movement of the top plate of the order of 20 mm where the chamber has a diameter of the order of 3050 mm and a height of the order of 9300. mm. The seal 5 at the top of the chamber 1 is intended to accommodate movements of this nature.

Referring to FIGS. 2 to 4 and 4A and 4B, the seal 5 consists of a circular carrier ring 6 having its inner axial surface 6A parallel to the axis of the ring; its radial surfaces 6B and 6C parallel and at right angles to the surface 6A, and its outermost surface 6D tapering inwardly of the ring in the direction from the surface 6B. The angle of taper is of the order of 3.°The ring is cut away to provide a chamber 6E between the surfaces 6B and 6D.

The radial surface 6B stops short of the inner axial surface 6A at a step 7 that accommodates an elastomer ring seal member 8 and an anti-extrusion ring 9 for the ring seal member 8, the seal member 8 being disposed between the anti-extrusion ring 9 and retaining plates 10 bolted to the axial inner surface 6A of the carrier ring 6. The seal member 8 can be manufactured from a hard natural rubber, the depth of this member in its uncompressed state being about 20% to 25% greater than that of the housing formed for it by the step and the top plate co-operating therewith (see FIG. 4A).

The surface 6D in similar manner stops short of the surface 6C at a step 11 that accommodates an elastomer seal member 12, having one radial face grooved to receive a header ring 13, the seal member 12 and the header ring 13 being held in the step 11 with the header ring loaded to urge the lips of the groove apart by retainer plates 14 bolted to the radial surface 6C of the carrier ring 6. The seal member 12 can be manufactured from a fabric reinforced rubber.

During initial assembly, the carrier ring 6, complete with elastomer seal members 8 and 12 and anti-extrusion ring 9, is placed inside the top of the chamber body 2, seating on a tapered surface 15 formed at the top end of the chamber body 2 to correspond with the tapered surface 6D of the carrier ring.

The top plate 4 is then lowered onto the chamber body 2. Its first contact (see FIG. 4A) is with the top elastomer seal member 8 which is then compressed by about 20% to 25% of its depth until the top plate 4 comes into contact with the carrier ring 6. The carrier ring 6 is then forced down inside the chamber body 2 through a small distance until the top plate 4 rests on the top of the chamber body itself (FIG. 2.) In this way a small amount of hoop compression is put into the carrier ring 6, and an initial seal of the seal members 8 and 12 with the top plate 4 and cylinder body 2 respectively is achieved.

During the use of the pressure chamber, as pressure in the chamber is increased the body 2 expands radially and the top plate 4 lifts. The hydraulic pressure acting on the inside and underside faces of the carrier ring 6 simultaneously forces the carrier ring 6 in the directions towards the chamber 2 and the top plate 4 thereby closing the gaps that tend to develop between the ring 6 and the body 2 and top plate 4 to an extent such that the seal members 8 and 12 can be effective to maintain a pressure tight seal. In effect, the carrier ring 6 slides upwards with respect to the chamber body 2 and outwards with respect to the top plate 4. It is therefore important that the co-efficient of sliding friction of these two mating surfaces is not so high as to prevent this movement to an extent sufficient to allow a gap or gaps to develop of sufficient width to cause one or both of the elastomer seal members 8, 12 to leak.

In expanding to follow the chamber body radial movement, plus the outward movement caused by sliding up the surface 15, the carrier ring 6 goes into a state of hoop tension. The tensile strain capacity of the ring 6 is selected to be sufficient for it to accommodate the maximum movement it will have to perform. For the movements referred to in the particular example being described, a copper alloy such as CMA2 to B.S. 1400 is one suitable example where the chamber body is constructed of steel.

As the carrier ring moves upwards on the chamber body during pressurization, friction forces at the body/carrier ring interface tend to lift the body. The extent of this tendency is reduced by the taper angle at the top of the chamber body. This upward force on the chamber body is resisted by the downward force of the chamber pressure acting on a continuation below the carrier ring of the tapered face 15 of the body 2.

The chamber fully-pressurized condition is illustrated in FIG. 3, the position from which the carrier ring 6 has moved being indicated by chain lines 6' and the original position of the cylinder body 2 being indicated by chain lines 2'.

As the chamber pressure is reduced from the maximum achieved during a pressurization cycle, the friction forces on the carrier ring/chamber body and carrier ring/top plate interfaces reduce and reverse and the ring commences to return to its rest position when the friction force at each interface reaches its limiting value. This is most unlikely to happen simultaneously at both interfaces and for all practical seal geometries, limiting friction is reached on the carrier ring/chamber body interface first. Up to this point from maximum pressure the carrier ring 6 has not moved with respect to either the chamber body 2 or the top plate 4. However, as the chamber pressure has been falling the normal reactions at the interfaces have increased as the chamber body and the top plate try to return to their original position. When the limiting friction force is reached at the carrier ring/chamber body interface the ring commences to slide down the chamber body surface. Because of the taper, this movement causes the chamber body opposite the seal to be progressively forced outwards.

After a further reduction in chamber pressure, limiting friction is reached on the carrier ring/top plate interface, and thereafter the ring slides inwards with respect to the top plate. The ring continues to slide down the chamber body and these two relative movements continue until the ring returns to its original position at zero chamber pressure.

During decreasing chamber pressure the friction force at the carrier ring/chamber body interface acts in harmony with the hydraulic force on the tapering face of the chamber body below the ring. Consequently the total vertical load on the chamber body as the chamber pressure falls is appreciably greater than the force at the same pressure when the chamber pressure is rising.

To minimise friction between the carrier ring 6 and the chamber body 2 and top plate 4, the two sliding surfaces 6B and 6D of the carrier ring 6 are coated with PTFE coating 6B' (FIG. 4A), 6D' (FIG. 4B). Small peripheral and radial grooves 16, 17 (FIGS. 4A, 4B) are machined in the sliding surfaces 6B and 6D of the carrier ring 6 so that if water leaks behind the elastomer seal members 12 and 8 any pressure build-up is relieved.

As the carrier ring section is small relative to its overall diameter, a handling jig would be utilised to facilitate installing the seal in and removing it from the chamber body without damage. The handling jig would include provisions for correctly positioning the seal within the top of the chamber body.

Other forms of seal that can be utilised in place of that just described and operating in a manner similar to that just described are shown in FIGS. 5 to 10. In the form of FIGS. 5 and 6 the carrier ring 6I is of substantially right-angled triangular section with the hypotenuse of the section extending from the chamber body surface 15 to the under surface of the top plate 4, that is from one to the other of the two surfaces of the carrier that are in use, in contact with the top plate 4 and the chamber body surface 15. The surface of this ring 6I that is in contact with the chamber body surface 15 is tapered as in the form already described. In the form of FIGS. 5 and 6, the seal members 8 and 12 are replaced by an elastomer seal member 18 secured to the surface of the ring 6I containing the hypotenuse of the ring section and extending all around this surface. At each end the seal member 18 terminates, beyond the carrier ring surfaces that contact the plate 4 and body surface 15, in a flap 18A or 18B respectively in contact with the top plate 4 and the chamber body surface 15.

Figure 7:
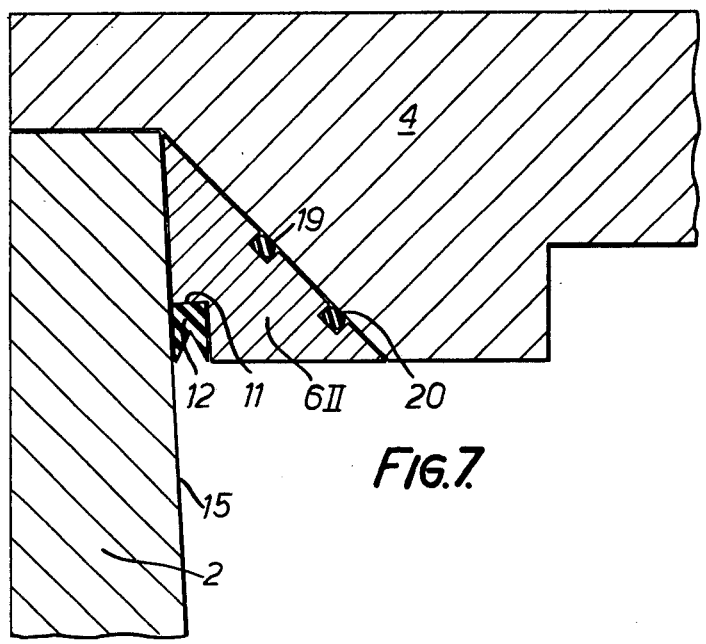
Figure 8:
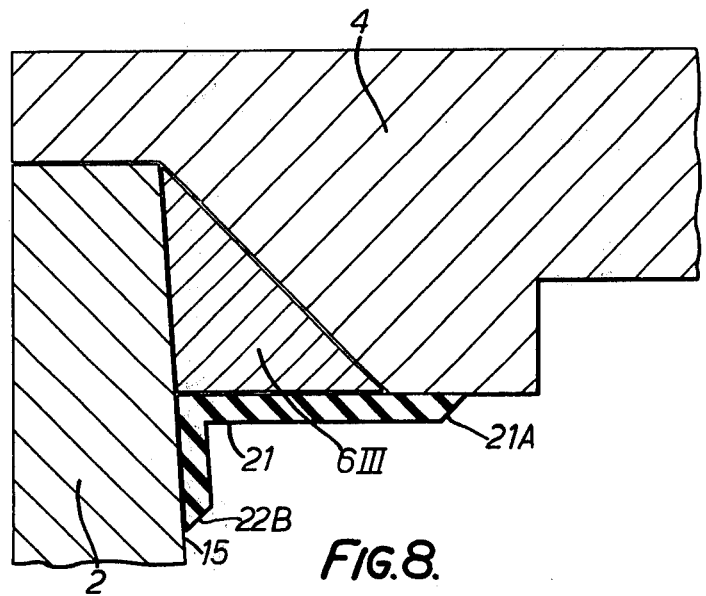

In each of the forms of FIGS. 7 and 8 the carrier ring 6II or 6III is again of substantially right-angled triangular section, but in these forms the surface containing the hypotenuse of this action co-operates with a correspondingly formed surface of the top plate 4, whilst the surface containing one of the remaining two sides is in contact with the chamber body surface 15 and is tapered as previously described. In the form of FIG. 7 this surface is stepped at 11 as already described and a seal member 12 as already described is provided, whilst the surface co-operating with the plate 4 carriers elastomer ring seal members 19 and 20.

In the form of FIG. 8 a single elastomer seal member 21 is provided which is in the form of an annulus secured to the surface connecting the surfaces of the carrier ring that contact the plate 4 and body surface 15, and projecting inwardly, at 21A, beyond the ring 6III to contact the top plate 4. A flange 22B depending from the outer part of this annulus forms an extension, for contacting the chamber body surface 15, of the carrier ring surface that contacts this body surface 15.

In FIG. 9 the carrier ring 6IV is of channel section with the web of the section co-operating with the chamber body 2 and having a tapered outer surface co-operating with the outer surface 15 of the body 2. This web, and the upper side member of the channel section carry elastomer seal members 23, 23 and 24, 24 sealing on the body surface 15 and the top plate 4. Similar seal members 23, 23 and 24, 24 are provided in the form of FIG. 10 but in this case the carrier ring 6V is of L-section, inverted in use. In addition, in this form, an elastomer flap seal member 25 is provided, carried by the depending portion of the ring 6V and co-operating with the chamber body surface 15 so that it forms an extension of the carrier ring surface that contacts this body surface 15. Such a seal member 25 could be provided alternatively or additionally for co-operating with the top plate 4 so that it forms an extension of the carrier ring surface that contacts the top plate 4. In the latter case the seal member could be formed by a single member.

It will be appreciated that the seal members such as 19, 20, 23 and 24 of the forms of FIGS. 7, 9 10 can take any suitable form and, for example, could be replaced by single members on the faces of the carrier ring in question, each similar to the seal members 8 and 12 (as appropriate) already described.

Turning to FIG. 11, at the base of the chamber 1 there is provided a seal 26 similar to that of FIGS. 2 to 4 as it has to accommodate the same chamber body radial movement relative to the bottom plate 3 as already described. The carrier ring 6' is proportioned similar to the top carrier ring 6 and is of the same material. The surface 6D' in contact with the chamber body 2 has a 3° taper machined to match a similar taper machined on the body 2 to ensure a tight fit against the body 2 on initial assembly. The surfaces of the carrier ring 6' in contact with the bottom plate 3 and the body 2 are coated with a PTFE coating to reduce friction on the bottom plate surface and to minimise the possibility of the ring 6 being pressure welded to the body 2. Peripheral and radial grooves are machined in these surfaces to relieve water pressure build-up should the elastomer seal members leak. Two elastomer seal members 27, 27 provided are similar to the seal member 12 of FIGS. 2 to 4, the header rings and retaining plates associated therewith being provided but not being shown in FIG. 11.

To ensure that the chamber body returns to its correct position at the end of each pressurization cycle, stops 29 are bolted to the bottom plate 3 in positions such that they are just touching the inside vertical surface of the carrier ring 6' at zero pressure. These stops 29 are located and fixed immediately after the chamber body 2, with the carrier ring 6' loosely fitted inside it, has been accurately positioned during initial assembly.

So far the seals 5 and 26 provided at the top and the bottom of the chamber have been described and it will be appreciated that each of these seals is for use with a hollow substantially cylindrical member and a member extending across this cylindrical member to close an end thereof, each seal serving for maintaining closure between these two members during radial movement of the cylindrical member and each seal comprising a carrier of ring configuration having a first surface for sliding contact with the inner surface of the cylindrical member and a second surface for sliding contact with a surface of the other member, the carrier carrying seal means disposed to be in contact with said surfaces of said members when said surfaces of said carrier and said members are in contact, and the carrier being able to expand or contract to permit said seal means to remain so in contact during said radial movement of the cylindrical member. In the case of the top seal 5, in addition to accommodating the radial movement of the cylindrical member, movement of the other member in the direction of right angles to such radial movement is accommodated, the carrier moving in this direction to permit said seal means to remain in contact with the other member.

It will be noted that the chamber body 2 is composed of a number of sections and further seals 30 are provided at the junction of these sections with one another. For completeness, and referring to FIGS. 12, 13 and 13A, each seal 30 consists of a carrier ring 31 made of the same material as the carrier rings so far described as similar radial movements have to be accommodated, having an inner surface 32 parallel with the axis of the ring and an outer surface consisting of two parts 33A and 33B that taper inwardly in the direction outwardly of the midpoint of the surfaces as a whole, each at an angle of the order of 3° and to match corresponding tapering surface portions of the chamber body 2 one at the top of one section of the body 2 and the other at the bottom of the immediately superimposed section of the body 2.

Each surface 33A, 33B terminates, at its outer edge, in a step 34 that accommodates a fabric reinforced rubber seal member 35 having an associated header ring 36 and being retained in position by plates 37 all as for the seal member 12 already described.

Although there will be no relative movement between the chamber body sections and the seals 30 the surfaces in contact with the cylinder are coated with a PTFE coating to reduce the possibility of the carrier ring becoming pressure welded to the cylinder. Grooves 38 (FIG. 13A) are machined in the surfaces 33B to relieve any water pressure build-up should the seal members 35 leak. To minimise the risk of dislodging or damaging the seals 30 during installation or removal of items to be tested in the pressure chamber, protective shield plates 39 are bolted to the inside surface of the carrier rings 31.

It will be appreciated that the chamber can be used to contain pressurized fluids other than water.

Where reference has been made to a PTFE coating, other materials could, of course, be used.

In constructional forms not shown, some or all of the surfaces described above as tapered are not tapered, and some or all of the surfaces described above as parallel to or normal to the carrier ring axis may be inclined to this axis.

We claim:

1. The combination of a hollow substantially cylindrical member a member extending across the cylindrical member to close an end thereof, and a seal for maintaining closure between these two members during radial movement of the cylindrical member; the seal comprising a carrier of ring configuration having an axis, a first surface on the carrier for sliding contact with the inner surface of the cylindrical member, a second surface on the carrier for sliding contact with a surface of the other member, said first surface tapering in a direction away from said second surface to form an acute angle with said axis, and seal means carried by the carrier and disposed to be in contact with said surfaces of said members when said surfaces of said carrier and said members are in contact, the carrier being able to expand or contract to permit said seal means to remain so in contact during said radial movement of the cylindrical member.

2. The combination according to claim 1, wherein said second surface of the carrier is perpendicular to the axis of the carrier, and wherein a further radial surface of the carrier is parallel to said second surface and at right angles to an inner axial surface of the carrier.

3. The combination according to claim 1, wherein said seal means comprises ring seal members mounted in said first and second surfaces of said carrier.

4. The combination according to claim 3, wherein steps are provided in said first and second surfaces of the carrier in which said ring seal members are disposed, and wherein retaining plates are provided that retain said ring seal members in said steps.

5. The combination according to claim 1, wherein the carrier is of substantially right-angled triangular section, the hypotenuse of this section forming a third surface of the carrier that extends from said first surface of the carrier to said second surface of the carrier.

6. The combination according to claim 5, wherein said seal means comprises a seal member carried by said third surface of the carrier, there being flaps terminating this seal member beyond said first and second surfaces of the carrier.

7. The combination according to claim 1, wherein the carrier is of substantially right-angled triangular section, the hypotenuse of this section constituting said second surface of the carrier.

8. The combination according to claim 7, wherein said seal means comprises an annulus secured to that surface of the carrier that connects said first and second surfaces of the carrier, this annulus having a projection that extends inwardly of the carrier, and a flange that forms an extension of said first surface of the carrier.

9. The combination according to claim 1, wherein the carrier is of channel section, the web of this section having its outer surface constituting said first surface of the carrier.

10. The combination according to claim 1, wherein the carrier is of L-section.

11. The combination according to claim 10, wherein the carrier is provided with a seal member that forms an extension of said first surface of the carrier.

12. The combination according to claim 10, wherein the carrier is provided with a seal member that forms an extension of said second surface of the carrier.

13. The combination according to claim 1, wherein said first surface of the carrier is provided with a friction-reducing coating.

14. The combination according to claim 1, wherein said second surface of the carrier is provided with a friction-reducing coating.

15. The combination according to claim 1, wherein said first surface is grooved.

16. The combination according to claim 1, wherein said second surface is grooved.

17. The combination according to claim 1, wherein said cylindrical member has an inner surface for contact with said seal means, said inner surface being tapered in correspondence with the taper of said first surface of said carrier.

* * * * *